US007124056B2

(12) United States Patent
Shibamori et al.

(10) Patent No.: US 7,124,056 B2
(45) Date of Patent: Oct. 17, 2006

(54) INFORMATION TRANSMISSION DEVICE FOR CONSTRUCTION MACHINE

(75) Inventors: Kazuhiro Shibamori, Mitsukaido (JP); Hiroyuki Adachi, Tsuchiura (JP); Hideki Komatsu, Kitasoma-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/333,265

(22) PCT Filed: Jul. 16, 2001

(86) PCT No.: PCT/JP01/06130

§ 371 (c)(1), (2), (4) Date: Jun. 13, 2003

(87) PCT Pub. No.: WO02/08527

PCT Pub. Date: Jan. 31, 2002

(65) Prior Publication Data

US 2004/0034511 A1 Feb. 19, 2004

(30) Foreign Application Priority Data

Jul. 21, 2000 (JP) ............................ 2000-220861

(51) Int. Cl.
*G06F 7/06* (2006.01)

(52) U.S. Cl. ...................... 702/182; 702/179; 702/183; 702/186

(58) Field of Classification Search .................. 702/57, 702/119, 122, 127, 188, 189, 179, 182; 701/28, 701/33, 50; 705/64; 707/200; 709/219; 340/679, 685; 342/357.17
See application file for complete search history.

(56) References Cited

U.S. PATENT DOCUMENTS

| | | | | |
|---|---|---|---|---|
| 3,774,156 | A * | 11/1973 | Marsalka et al. | 710/70 |
| 5,961,923 | A * | 10/1999 | Nova et al. | 422/68.1 |
| 5,974,348 | A * | 10/1999 | Rocks | 701/28 |
| 2004/0024502 | A1 * | 2/2004 | Squires et al. | 701/33 |

FOREIGN PATENT DOCUMENTS

| | | |
|---|---|---|
| JP | 07-87005 | 3/1995 |
| JP | 10-46631 | 2/1998 |
| JP | 11-36381 | 2/1999 |

* cited by examiner

*Primary Examiner*—Marc S. Hoff
*Assistant Examiner*—Felix Suarez
(74) *Attorney, Agent, or Firm*—Crowell & Moring LLP

(57) ABSTRACT

An information transmitting device to supply operation data of a machine as needed and without unnecessary data. The information transmitting device includes information control device 4, remote base station 9, transmission means, e.g. communication satellite 6, and selected data outputting means for selecting and transmitting predetermined operation data from operation data collected. Information control device includes operation data collecting unit 4*a* and communication control unit 4*b* which includes transmitting and receiving parts. Selected data outputting means includes operation data selecting device 9*e* (external operating device 12) and, in information control device 4: identifier designating unit 4*c* for designating an identifier for selected operation data, identifier memory unit 4*d*, and transmission data preparing unit 4*e* for reading operation data, which correspond to an identifier designated by identifier designating unit 4*c*, from operation data collecting unit 4*a*, and preparing operation data for transmission.

4 Claims, 9 Drawing Sheets

FIG. 3

| | | |
|---|---|---|
| | MODEL AX | MACHIN NO. N |
| I | FEB. 3, 2000 | TN(1) TD(1) |
| : | : | |
| K | MAR. 15, 2000 | TN(K) TD(K) |
| | | |
| | | |
| | | |
| | | |
| | | |

DAILY REPORT DATA

| DATA NO. | MODEL | MACHINE NO. | Y/M/D | ENGINE OPERATION TIME (MIN) | COMULATIVE OPERATION TIME (HR) |
|---|---|---|---|---|---|
| 1 | AX | N | FEB. 3, 2000 | 59 | 110.20 |
| 2 | AX | N | FEB. 4, 2000 | 360 | 116.20 |
| : | : | : | : | : | : |
| K | AX | N | MAR. 15, 2000 | 410 | 300.33 |

[TYPE A DATA]

[TROUBLE DATA]

| TROUBLE CODE | DETAILS | |
|---|---|---|
| 10 | ABNORMALITY IN DELIVERY PRESSURE FROM PUMP 1 | |

DAILY REPORT DATA

| DATA NO. | MODEL | MACHINE NO. | Y/M/D | ENGINE OPERATION TIME (MIN) | COMULATIVE OPERATION TIME (HR) |
|---|---|---|---|---|---|
| 1 | AX | N | FEB. 3, 2000 | 59 | 110.20 |
| 2 | AX | N | FEB. 4, 2000 | 360 | 116.20 |
| : | : | : | : | : | : |
| K | AX | N | MAR. 15, 2000 | 410 | 300.33 |

[TYPE B DATA]

[TROUBLE DATA]

| TROUBLE CODE | DETAILS | |
|---|---|---|
| 21 | ABNORMALITY IN TRAVEL DRAIN PRESSURE | |
| | | |

FIG. 9

DAILY REPORT DATA [TYPE C DATA]

| DATA NO. | MODEL | MACHINE NO. | Y/M/D | FUEL LEVEL | LATITUDE | | | LONGITUDE | | |
|---|---|---|---|---|---|---|---|---|---|---|
| 1 | AX | N | FEB. 3, 2000 | 49 | 42 | DB | 5C | 66 | 1D | 9A |
| 2 | AX | N | FEB. 4, 2000 | 100 | 42 | DA | 13 | 66 | 1C | DA |
| : | : | : | : | : | | : | | | : | |
| K | AX | N | MAR. 15, 2000 | 82 | 42 | D9 | FD | 66 | 1C | DD |

[TROUBLE DATA]

| TROUBLE CODE | DETAILS | |
|---|---|---|
| 107 | TERMINAL : ABNORMALITY IN HARNESS | |
| | | |

INFORMATION TRANSMISSION DEVICE FOR CONSTRUCTION MACHINE

TECHNICAL FIELD

This invention relates to an information transmitting system for a construction machine such as a hydraulic excavator, which transmits operation data, which have been obtained as a result of various work by the construction machine, to a base station arranged at a remote place.

BACKGROUND ART

As a conventional technique of this type, there is, for example, the technique disclosed in JP-A-11024744. According to this conventional technique, a construction machine is provided with sensors for detecting operation states, an operation data collecting device for collecting operation data detected by the sensor, and a communication device and antenna for transmitting the operation data collected in the operation data collecting device. The communication device includes a communication unit. Also disclosed are a base station for receiving signals, which have been outputted from the communication device, via a communication satellite, for example, and user equipment connected to the base station via a communication line. The base station is arranged at a place remote from the construction machine, and the user equipment is such that can directly receive the operation data of the construction machine via the antenna arranged on the construction machine.

According to this conventional technique, the operation data collected by the operation data collecting device are transmitting in their entirety to the base station or the user equipment. By the base station or the user equipment, the operation data of the construction machine are controlled and can be retrieved by a user as needed.

With the above-described conventional technique, various operation data of the construction machine which is performing work can be obtained by the base station at the remote place or by the user equipment. These operation data can be used, for example, for predicting a maintenance schedule for the construction machine, predicting a replacement schedule to a new construction machine, and providing the customer of the construction machine with information on the construction machine.

When the construction machine is a hydraulic excavator or the like, for example, the operation data include an extremely wide variety of data, that is, data based on operating pilot pressures such as digging time, traveling time and swinging time, data based on a main hydraulic circuit such as pump load, swing load and travel load, data relating to an engine such as operation time, coolant temperature and fuel level, data associated with working oil such as working oil temperature and existence or nonexistence of filter clogging, position data indicating an actual position of the construction machine, and data on the use of a special attachment, such as a breaker or crusher, mounted upon performing special work.

The conventional technique is high in communication cost, because it transmits the above-mentioned various data in their entirety, for example, to the base station via a communication satellite or to the user equipment by using a telephone line. When transmission is performed via the communication satellite, for example, the communication cost is the product of the size of data and a unit price per byte. When the telephone line is used, on the other hand, the communication cost is the product of time of transmission, which is determined depending upon the size of data, and a unit price per unit time. Accordingly, the communication cost increases with the size of data to be transmitted.

For the user, on the other hand, such various data as mentioned above are not often required in their entirety. Further, necessary operation data may differ depending upon the user.

The present invention has been completed in view of the above-mentioned current circumstance of the conventional technique, and has as an object thereof the provision of an information transmitting system for a construction machine, said information transmitting system being capable of supplying operation data of the construction machine as much as needed by its user or the like without unnecessary data.

DISCLOSURE OF THE INVENTION

To achieve the above-described object, the present invention is characterized in that in an information transmitting system for a construction machine, said system comprising an information control device, which includes an operation data collecting unit and a transmission unit for transmitting operation data collected in the operation data collecting unit, and to be mounted on the construction machine, a base station arranged at a place remote from the construction machine for being inputted with the operation data, and a transmission means for transmitting the operation data, which are transmitted from the transmission unit of the information control device, to the base station, the information transmitting system is provided with a selected data outputting means for selecting predetermined operation data from the operation data, which have been collected in the operation data collecting unit of the information control device, and transmitting the predetermined operation data; the selected data outputting means comprises an operation data collecting device for outputting a command signal to select the predetermined operation data, an identifier designating unit arranged in the information control device to designate an identifier for the specification of the operation data selected in response to the command signal outputted from the operation data collecting device, and a transmission data preparing unit arranged in the information control device to read operation data, which correspond to an identifier designated by the identifier designating unit, from the operation data collecting unit and to prepare the operation data as transmission data; and the selected data outputting means comprises an identifier memory unit arranged in the information control device to store the identifier designated by the identifier designating unit.

According to the present invention constructed as described above, the selected data outputting means can select only operation data, which are desired by a user, and can transmit them to the base station via the communication means.

In the above-mentioned construction, the selected data outputting means may comprise an operation data collecting device for outputting a command signal to select the predetermined operation data; an identifier designating unit arranged in the information control device to designate an identifier for the specification of the operation data selected in response to the command signal outputted from the operation data collecting device; and a transmission data preparing unit arranged in the information control device to read operation data, which correspond to an identifier designated by the identifier designating unit, from the operation data collecting unit and to prepare the operation data as transmission data.

In this construction, the selected data outputting means may comprise an identifier memory unit arranged in the information control device to store the identifier designated by the identifier designating unit.

Further, the operation data selecting device may be arranged at the base station; and the information control device to be mounted on the construction machine may have a receiving part for receiving a command signal, which is outputted from the operation data collecting device of the base station, via a predetermined transmitting means.

As an alternative, the operation data selecting device may comprise a portable, external operating device connectable to the information control device to be mounted on the construction machine.

Further, each of the above-mentioned constructions may further comprise an operating device to be arranged on a side of a user, said operating device being connectable to the base station via a communication means such that the data transmitted to the base station can be read.

BRIEF DESCRIPTION OF THE DRAWINGS

FIG. 3 is a data pattern showing a data storage format for an operation data collecting unit arranged in the information control device depicted in FIG. 2.

FIG. 9 is a data pattern showing output data available to the user when type C data are selected.

BEST MODES FOR CARRYING OUT THE INVENTION

The embodiment of the information transmitting system according to the present invention for the construction machine will hereinafter be described based on the drawings.

Figure 1:
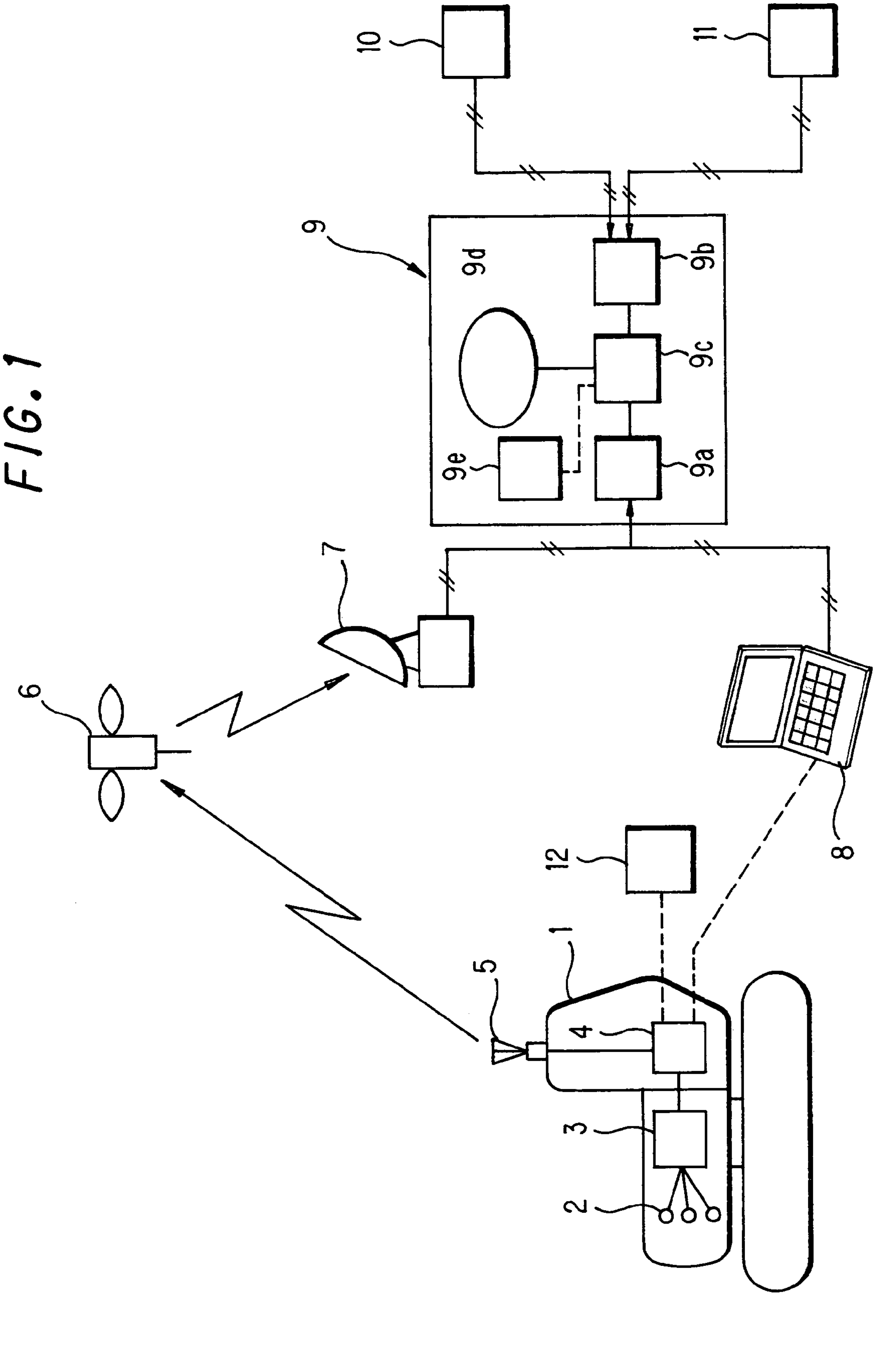
FIG. 1 is a simplified block diagram illustrating the overall construction of one embodiment of the information communication system according to the present invention for the construction machine.

A construction machine 1 shown in FIG. 1, such as a hydraulic excavator, is provided with various sensors 2 for detecting operation states of the construction machine 1, such as oil temperature sensors, angle sensors, engine speed sensor and operating switches; a controller 3 for being inputted with signals detected by these sensors 2 and performing processing for the control of driving of the construction machine 1 and preparing various operation data, both based on the values of these signals; and an information control device 4 for being inputted with the above-mentioned operation data prepared by the controller 3.

Figure 2:
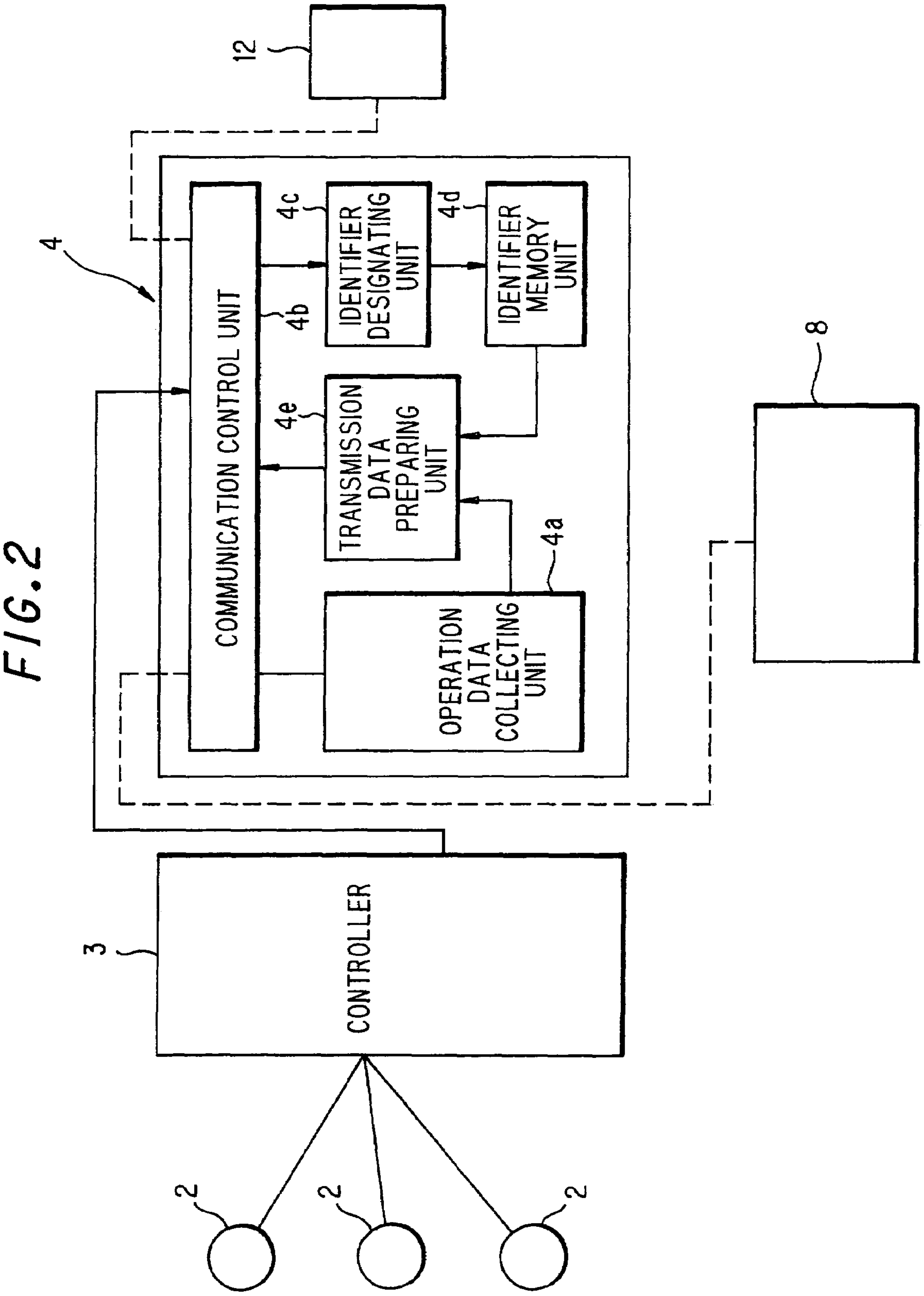
FIG. 2 is a block diagram depicting the construction of units making up an information control device arranged in the embodiment illustrated in FIG. 1.

As depicted in FIG. 2, the information control device 4 is provided with an operation data collecting unit 4*a* which collects various operation data of the construction machine 1 as outputted from the controller 3. As shown in FIG. 3, the operation data collecting unit 4*a* has a memory area for operated dates of the construction machine 1 and identifiers such as TN(1) . . . TN(K) and TD(1) . . . TD(K) as elements for specifying various operation data, respectively, and is designed such that in combination with the individual identifiers, details of their corresponding operation data are stored. Now assuming that an identifier for engine operation time (unit: minutes) is TN(K), for instance, the details of operation data stored in connection with TN(K) at the operation data collecting unit 4*a* take, for example, the numerical form of 59, 792, and so on.

This information control device 4 further includes a transmitting unit for transmitting operation data collected in the operation data collecting unit 4*a*, a receiving part for receiving a command signal transmitted from the outside of the construction machine 1, an input/output unit making up a connection unit with an external device, and a timer for clocking every day, i.e., 24 hours in minutes, for example; and is provided with a communication control unit 4*b* having functions to perform logical decisions and operations, an identifier designating unit 4*c* for designating the above-mentioned identifiers corresponding to various operation data, an identifier memory unit 4*d* for storing the identifiers designated by the identifier designating unit 4*c*, and a transmission data preparing unit 4*e* for reading operation data, which correspond to the identifiers stored in the identifier memory unit 4*d*, from the operation data collecting unit 4*a* when the timer contained in the communication control unit 4*b* has hit a predetermined time, for example, 0:00 a.m., preparing them into transmission data and supplying the transmission data to the communication control unit 4*b*.

The transmission data, which have been prepared at the transmission data preparing unit 43 and inputted in the communication control unit 4*b*, are transmitted from an antenna 5 arranged on the construction machine 1, for example, to a communication satellite 6 as illustrated in FIG. 1.

As illustrated in FIG. 1, this embodiment is also provided with an operation data selecting device for outputting a command signal to select predetermined operation data, for example, a portable, external operating device 12 connectable to the communication control unit 4*b* of the information control device 4 to be mounted on the above-mentioned construction machine 1 and also with a potable personal computer 8 into which operation data collected in the operation data collecting unit 4*a* of the information control device 4 can be down-loaded. This portable personal computer 8 is carried as needed, and upon use, is connected to the communication control unit 4*b* of the information control unit 4.

The above-mentioned communication data, which have been delivered to the above-mentioned communication satellite 6, are transmitted to an earth station 7 and are further transmitted to a base station 9, for example, via a public line. On the other hand, the operation data down-loaded in the portable personal computer 8 can be transmitted to the base station 9, for example, via a public line.

The base station 9 is arranged, for example, inside the head office of the maker of the construction machine 1, said head office being located at a place remote from the construction machine 1, and is provided with an input and output units 9*a*, 9*b*, a central processing unit, i.e., CPU 9*c* for performing various logical decisions and processings, a data base 9*d* for storing the above-mentioned transmission data inputted from the input/output unit 9*a*, that is, the operation data of the construction machine 1, and an operation data selecting device 9*e* for outputting command signals to select predetermined operation data.

In the above-mentioned data base 9*d*, the communication data inputted from the input/output unit 9*a*, that is, the operation data of the construction machine 1 are stored in their entirety and in addition, three data patterns consisting of type A data, type B data and type C data are also stored as exemplary data patterns desired by the user.

The type A data include operation data on driving of the engine, for example, an engine speed frequency histogram over 100 hours, operation data on driving of a pump, for example, a pump load frequency histogram based on pump delivery pressures over 100 hours, daily report data such as operated minutes of the engine, and trouble data of the construction machine 1.

The type B data include data on working oil, for example, a working oil temperature frequency histogram showing the frequency distribution of working oil temperatures over 100 hours, operation data on swinging operation, for example, a swing load frequency histogram over 100 hours, operation data on traveling operation, for example, a travel load frequency histogram over 100 hours, daily report data such as operated minutes of the engine, and trouble data of the construction machine 1.

The type C data include daily report data including data on fuel, for example, fuel levels and data on positions of the construction machine 1, for example, the latitudes and longitudes of positions where the construction machine 1 were located, and trouble data of the construction machine 1.

As illustrated in FIG. 1, for example, this embodiment is also provided with a personal computer 10 at a branch office or a plant, said personal computer being connected to the input/output unit 9*b* of the base station 9, for example, via a leased line, and further with another personal computer 11 held by the user and connected to the input/output unit 9*b* of the base station 9, for example, via a public line.

Figure 4:
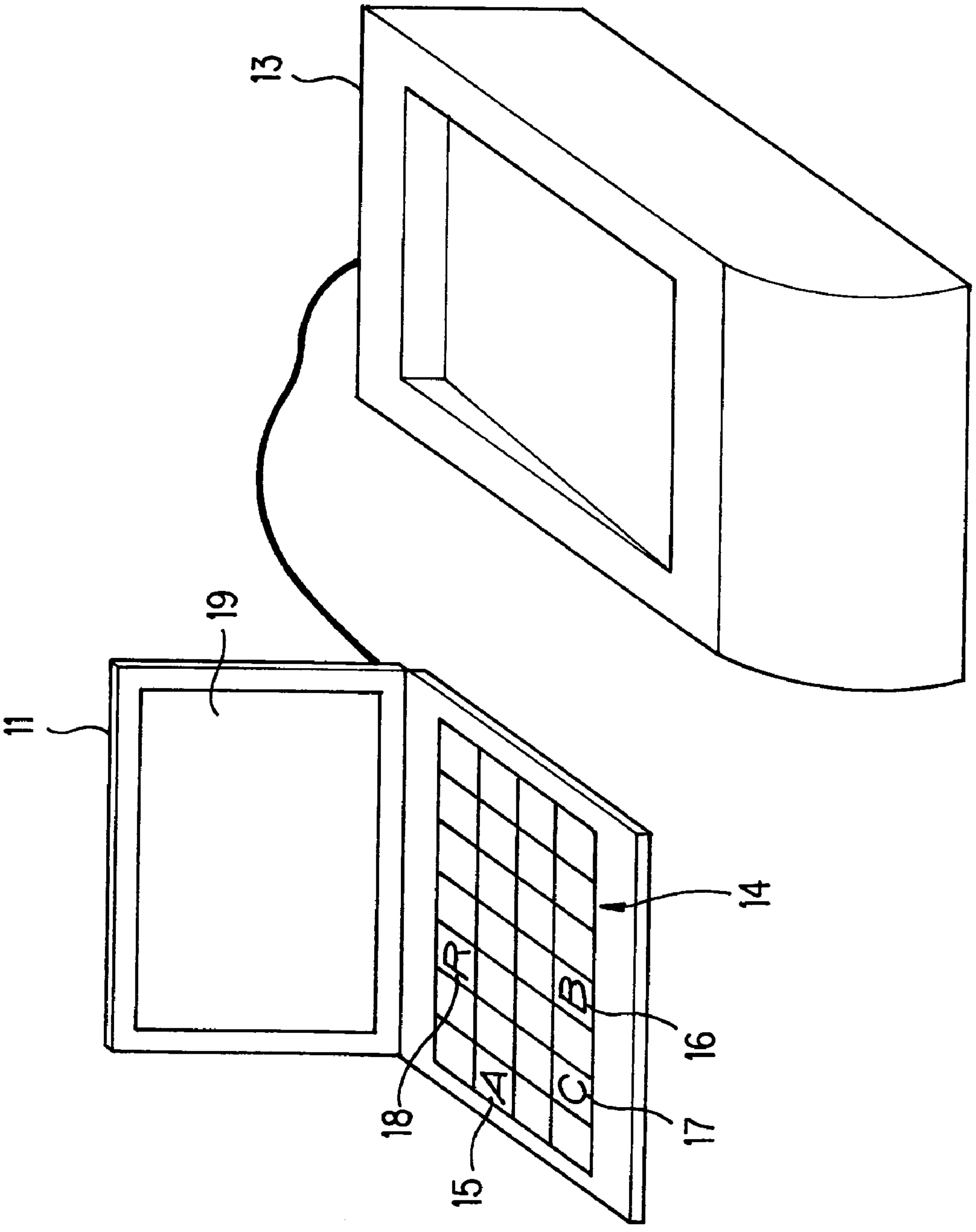
FIG. 4 is a perspective view illustrating components of a user's PC and a PC-associated device, which are arranged in the embodiment depicted in FIG. 2.

As shown in FIG. 4, the personal computer 11 held by the user is provided with an operating part, specifically a keyboard with keys 15, 16, 17, 18 arranged thereon and also a display screen 19. When the key 15 is pressed, the type A data stored in the data base 9*d* of the base station 9 are displayed on the display screen 19. When the key 16 is pressed, the type B data stored in the data base 9*d* of the base station 9 are displayed on the display screen 19. When the key 17 is pressed, the type C data stored in the data base 9*d* of the base station 9 are displayed on the display screen 19. When the key 18 is pressed, the operation data stored in the data base 9*d* of the base station 9 can be displayed in their entirety on the display screen 19. A printer 13 is connected to the personal computer 11.

The portable, external operating device 12, the identifier designating unit 4*c*, identifier memory unit 4*d*, transmission data preparing unit 4*e* and communication control unit 4*b* included in the information control device 4 arranged on the construction machine 1, and the operation data selecting device 9*e*, CPU 9*c* and input/output unit 9*a* included in the base station 9—all of which have been mentioned in the above—make up the selected data outputting means for selecting and outputting predetermined operation data from the operation data collected in the operation data collecting unit 4*a* of the information control unit 4 arranged on the construction machine 1.

On the other hand, the antenna 5 arranged on the construction machine 1, the communication satellite 6 and the earth station, all of which have been mentioned in the above, make up the communication means which supplies, to the input/output unit 9*a* of the base station 9, operation data transmitted from the communication unit contained in the communication control unit 4*b* of the information control device 4.

Operation of this embodiment constructed as described above will be described based on the flow charts shown in FIGS. 5 and 6.

Based on signals outputted from the sensors 2, various operation data of the construction machine 1 are prepared at the controller 3, and these operation data are collected in their entirety in the operation data collecting unit 4*a* via the communication control unit 4*b* of the information control device 4 depicted in FIG. 2. Now assume, for example, that work has been performed by the construction machine 1 for 100 hours or longer and that an engine speed frequency histogram, a pump load frequency histogram, a working oil temperature frequency histogram, a swing load frequency histogram, a travel load frequency histogram and the like have been collected in the operation data collecting unit 4*a*. Also assume that the communication control unit 4 has been set beforehand such that, when the timer in the communication control unit 4 hits 0:00 a.m., the timer is turned on to initiate data transmission.

Also assume, for example, that the portable, external operating device 12 shown in FIGS. 1 and 2 is connected to the communication control unit 4*b* of the information control device 4 on the construction machine 1 and that the operating element of the external operating device 12, said operating element corresponding to the above-mentioned type A data, is operated to output a command signal, which selects the type A data, to the input/output unit of the communication control unit 4*b*.

Figure 5:
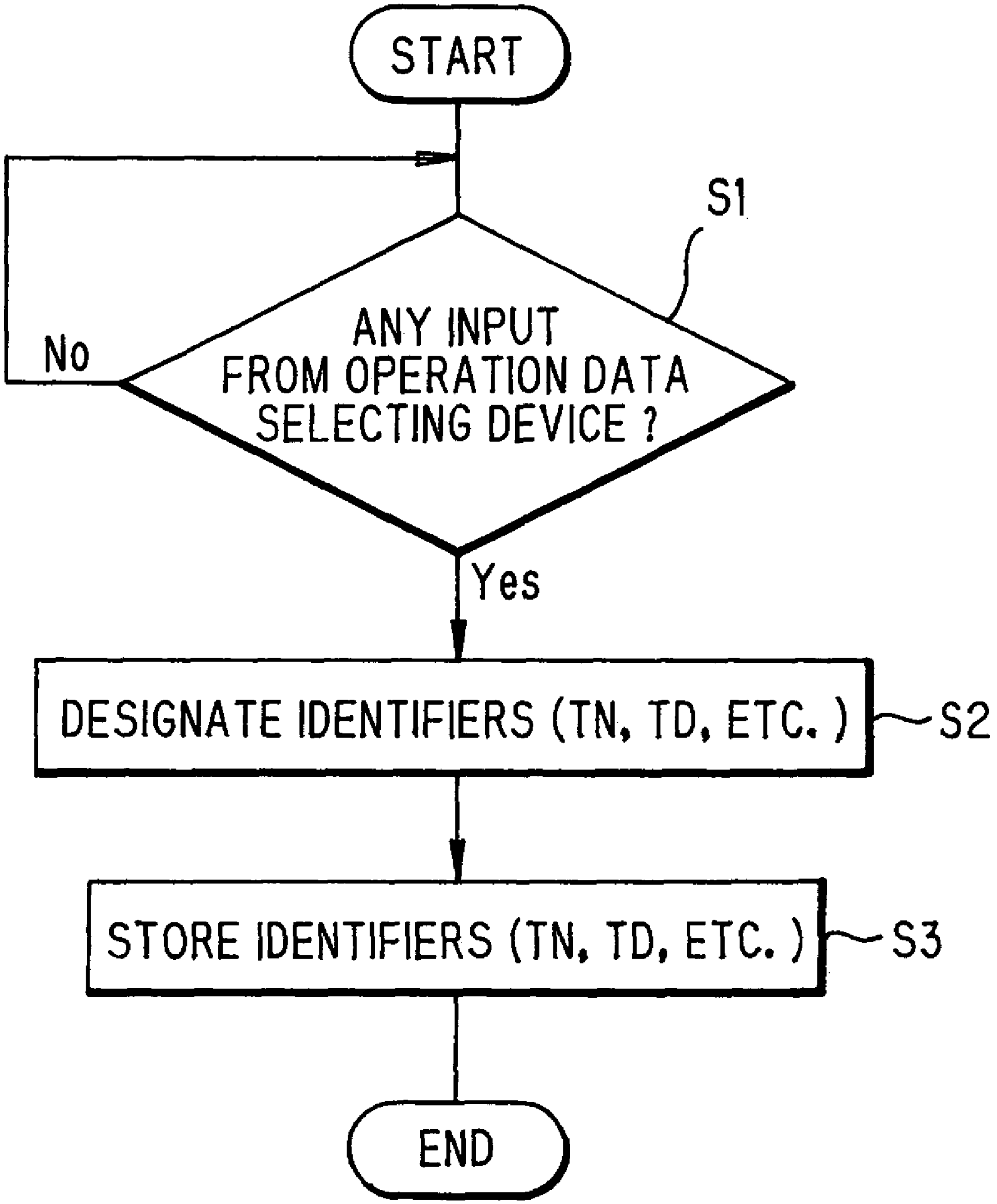
FIG. 5 is a flow chart illustrating a processing procedure upon selecting data in the information control device depicted in FIG. 2.

At the communication control unit 4*b* of the information control device 4, it is determined, as shown in step S1 of FIG. 5, whether or not any command signal has been inputted from the operation data collecting device (the portable, external operating device 12). If the command signal has been inputted, the routine advances to step S2. In this step S2, processing is performed at the identifier designating unit 4*c* to designate identifiers (TN, TD, etc.), which are elements to specify operation data, on the basis of the command signal for selecting the type A data, in other words, identifiers (TN, TD, etc.) relating to the type A data. The routine then moves to step S3, in which the identifiers designated in the above-mentioned step S2 are stored in the identifier memory unit 4*d*.

Figure 6:
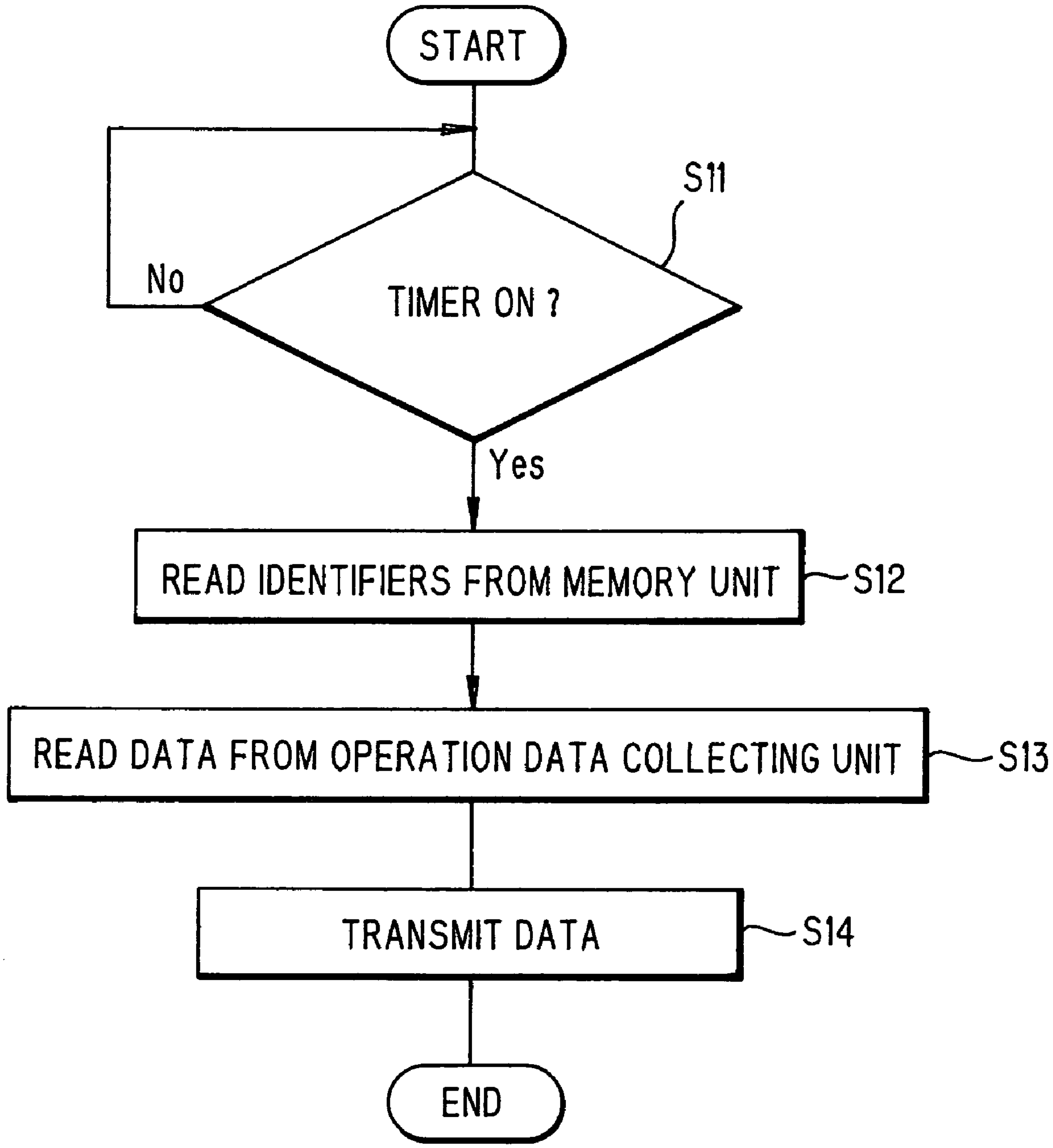
FIG. 6 is a flow chart illustrating a processing procedure upon transmitting data in the information control device depicted in FIG. 2.

When in a state with such processing having been performed, it becomes 0:00 a.m. and the timer in the communication control unit 4*b* is turned on, the decision of step S11 in FIG. 6 becomes "YES", and at the transmission data preparing unit 4*e*, processing is performed to prepare transmission data. Described specifically, processing is performed to read identifiers, which relate to the type A data and have been stored in the identifier memory unit 4*d*, and to input them into the transmission data preparing unit 4*e* as shown in step S12 of FIG. 6. As shown in step S13, processing is then performed to read the operation data, which are contained in the type A data collected in the operation data collecting unit 4*a*, on the basis of the identifiers read in step S11 and to input them into the transmission data preparing unit 4*e*. As indicated in step S14, the operation data contained in the type A data are then delivered as transmission data to the communication control unit 4*b*.

The above-mentioned transmission data are sent to the communication satellite 6 via a transmitting section of the communication control unit 4*b* and the antenna 5 shown in FIG. 1, and are transmitted from the communication satellite 6 to the earth station 7. Further, the transmission data are transmitted from the earth station 7 to the input/output unit 9*a* of the earth station 9, for example, via a public line. At the earth station 9, the transmission data so inputted, that is, the operation data contained in the type A data are stored in the data base 9*d* under control by CPU 9*c*.

Figure 7:
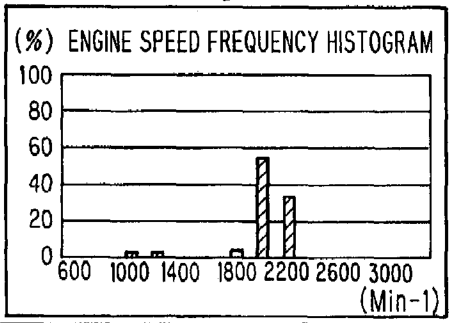
FIG. 7 is a data pattern showing output data available to the user when type A data are selected.
Figure 7:
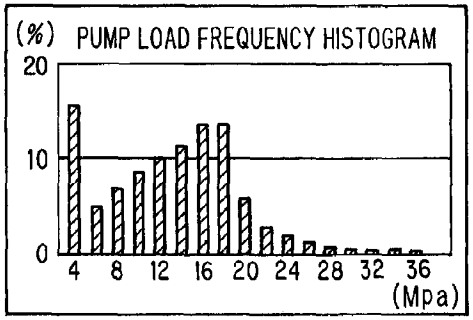

When the personal computer 11 shown in FIGS. 1 and 4 and held by the user is operated, for example, at the key 15 in the state that the operation data contained in the type A data have been stored in the data base 9*d* as described above, the resulting operation signal is read in CPU 9*c* via the input/output unit 9*b* at the base station 9 illustrated in FIG. 1. The operation data contained in the type A data, said operation data having been stored in the data base 9*d*, are read under control by CPU 9*c*, and the data are displayed on the display screen 19 of the personal computer 11 via the input/output unit 9*b*. When printing is instructed in this state, for example, the printer 13 is actuated so that a sheet of printer paper, for example, with the type A data recorded thereon as shown in FIG. 7 is printed out. In this manner, the user can confirm the desired type A data on the construction machine 1.

Figure 8:
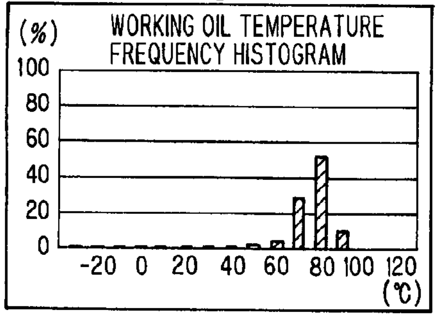
FIG. 8 is a data pattern showing output data available to the user when type B data are selected.
Figure 8:
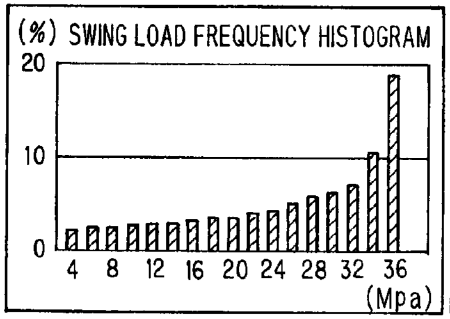
Figure 8:
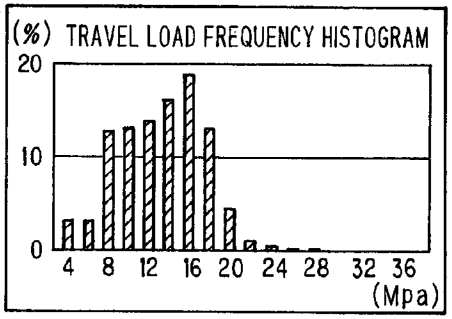

Concerning the type B data and type C data different from the type A data, similar operations and processings as mentioned above are performed. When the key 16 or 17 of the personal computer 11 is operated to perform printing operation with the type B data or type C data displayed on the display screen 19, for example, the printer 13 is actuated to print out a sheet of printer paper with the type B data recorded thereon as shown in FIG. 8 or a sheet of printer paper with the type C data recorded thereon as depicted in FIG. 9.

In the above description, the personal computer 11 held by the user was operated by way of example. When the personal computer 10 at the branch office or the plant is operated, desired one or more of the type A data, type B data and type C data can also be retrieved in a similar manner.

The above description was made about the processing as a result of each selective operation of the external operating device 12 connectable to the construction machine 1. However, operation of the operation data selecting device 9*e* also makes it possible to select specific operation data.

When an operating element of the operation data selecting device 9*e* shown in FIG. 1, said operating element corresponding to the above-mentioned type A data, is operated to output a command signal, which selects the type A data, to CPU 9*c*, signals corresponding to the type A data are delivered to the earth station 7 via the input/output unit 9*a* and are then sent from the earth station 7 to the communication satellite 6. The signals are transmitted further from the communication satellite 6 to the antenna 5, and are then inputted into the receiving part of the communication control unit 4*b* of the information control device 4. Processing in the communication control unit 4*b* at this time is similar to that described above with reference to the flow charts illustrated in FIGS. 5 and 6.

Described specifically, the data contained only in the type A data are selected, transmitted to the base station 9 via the antenna 5, communication satellite 6 and earth station 7, and stored in the data base 9*d* of the base station 9. If the user operates the personal computer 11, for example, at the key 14 depicted in FIG. 4, the type A data are hence displayed on the display screen 19 and can be printed out on a sheet of printer paper by the printer 13. In this manner, it is also possible to transmit only operation data desired by the user to the earth station 9 by remote operation.

It is also possible, as needed, to connect the portable personal computer 8 illustrated in FIG. 1 to the information control device 4 and to down load operation data from the operation data collecting unit 4*a* in which the operation data have been collected. In this case, the operation data down loaded in the portable personal computer 8 may be transmitted, for example, to the base station 9 via a public line. As an alternative, a floppy disk which as a recording medium, contains the operation data stored therein may be carried to the base station 9, and operation may then be performed to store the operation data, which are contained in the floppy disk, in the data base 9*d* of the base station 9.

According to this embodiment in which transmission of operation data is performed as mentioned above, the operation data collected in the operation data collecting unit 4*a* of the information control device 4 of the construction machine 1 are not transmitted in their entirety but are transmitted only as much as needed by the user or the like. This has made it possible to avoid transmission of useless data and hence, to reduce the transmission-related communication cost. Accordingly, the above-described embodiment can meet desires of the user or the like and moreover, is excellent in economy.

INDUSTRIAL APPLICABILITY

According to the invention as described in any one of the claims, operation data of the construction machine can be supplied only as much as needed by its user or the like without unnecessary data, in other words, the size of data to be transmitted can be reduced, so that the communication cost can be lowered than the conventional communication cost and excellent economy can be assured.

The invention claimed is:

1. An information transmitting system for a construction machine, said system comprising an information control device, which includes an operation data collecting unit for collecting various operation data and a transmission unit for transmitting operation data collected in said operation data collecting unit, and to be mounted on said construction machine, a base station arranged at a place remote from said construction machine for being inputted with said operation data, and a transmission means for transmitting said operation data, which are transmitted from said transmission unit of said information control device, to said base station, characterized in that:

said operation data collecting unit is provided with a memory area for storing operated dates and identifiers for specifying said various operation data, respectively, wherein details of said operation data are stored together with their corresponding identifiers, said information transmitting system is provided with a selected data outputting means for selecting predetermined operation data from said operation data, which have been collected in said operation data collecting unit of said information control device, and transmitting said predetermined operation data;

said selected data outputting means comprises an operation data collecting device for outputting a command signal to select said predetermined operation data on a basis of a data pattern consisting of plural operation data, an identifier designating unit arranged in said information control device to designate an identifier for the specification of said operation data selected from said data pattern in response to said command signal outputted from said operation data collecting device, and a transmission data preparing unit arranged in said information control device to read operation data, which correspond to an identifier designated by said identifier designating unit, from said operation data collecting unit and to prepare said operation data as transmission data; and said selected data outputting means comprises an identifier memory unit arranged in said information control device to store said identifier designated by said identifier designating unit.

2. An information transmitting system according to claim 1, wherein:

said operation data selecting device is arranged at said base station; and said information control device to be mounted on said construction machine has a receiving part for receiving a command signal, which is outputted from said operation data collecting device of said base station, via a predetermined transmitting means.

3. An information transmitting system according to claim 1, wherein said operation data selecting device comprises a portable, external operating device connectable to said information control device to be mounted on said construction machine.

4. An information transmitting system according to claim 1, further comprising an operating device to be arranged on a side of a user, said operating device being connectable to said base station via a communication means such that said data transmitted to said base station can be read.

* * * * *